F. E. & K. E. BANNING.
ANTISKID DEVICE.
APPLICATION FILED AUG. 15, 1916.
1,267,837.
Patented May 28, 1918.
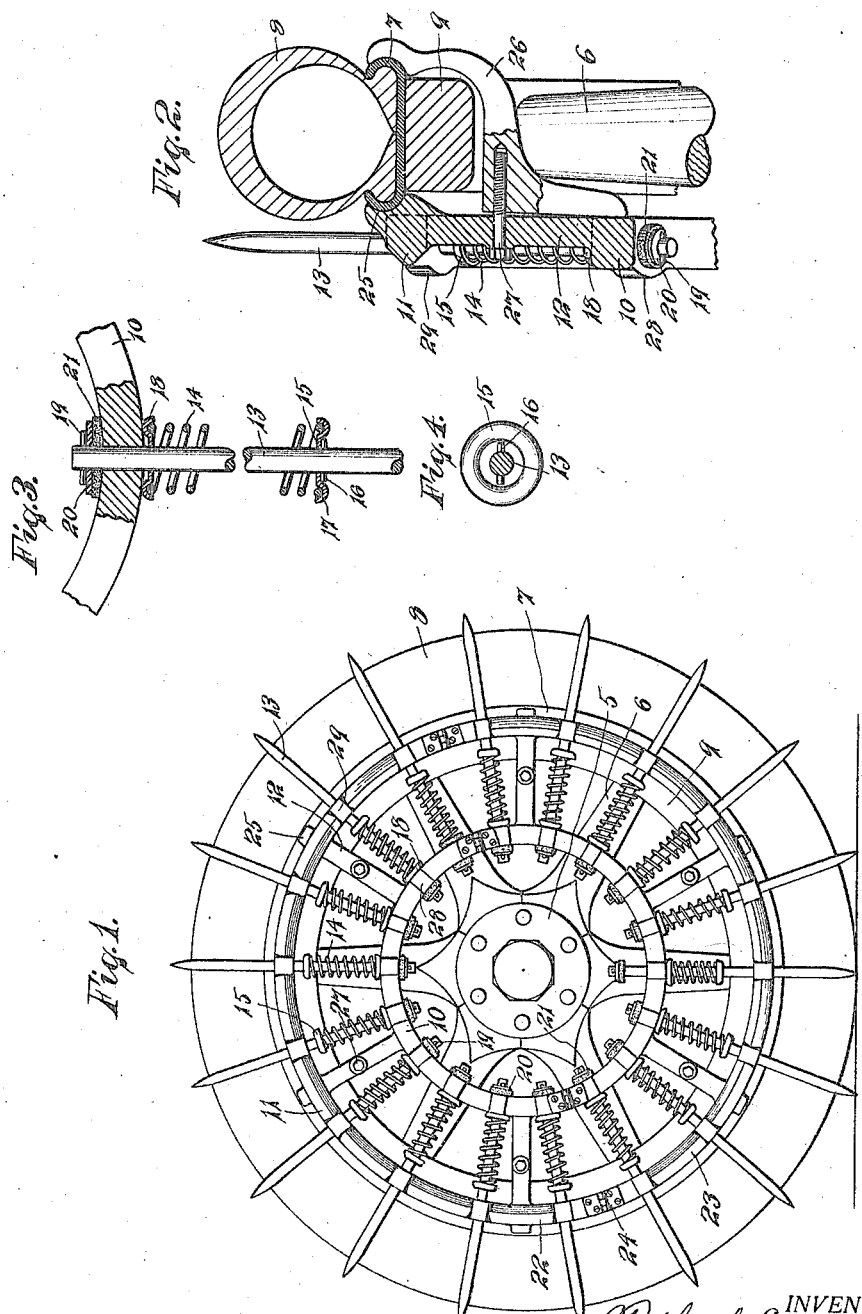
INVENTOR.
Frederick E. Banning,
BY Keney E. Banning,
Arthur B. Jenkins
ATTORNEY.

UNITED STATES PATENT OFFICE.

FREDERICK E. BANNING AND KEENEY E. BANNING, OF HADLYME, CONNECTICUT.

ANTISKID DEVICE.

1,267,837.  Specification of Letters Patent.  Patented May 28, 1918.

Application filed August 15, 1916. Serial No. 115,002.

*To all whom it may concern:*

Be it known that we, FREDERICK E. BANNING and KEENEY E. BANNING, both citizens of the United States, and residents of Hadlyme, in the county of New London and State of Connecticut, have invented a new and Improved Antiskid Device, of which the following is a specification.

Our invention relates to the class of devices that are used on vehicle wheels to prevent slipping, and an object of our invention, among others, is to provide a device of this class that shall be particularly efficient for the purpose, and one that may be readily attached to and detached from a vehicle wheel.

One form of device embodying our invention and in the construction and use of which, the objects herein set out, as well as others, may be attained, is illustrated in the accompanaying drawings, in which:

Figure 1 is a view in side elevation of a vehicle wheel with our improved anti-skid device attached thereto.

Fig. 2 is a detail view, scale enlarged, through the rim of a vehicle wheel and illustrating the means for securing the anti-skid device in place.

Fig. 3 is a detail view showing the method of attachment of the buffers at the ends of the prongs, and also the means for supporting the springs.

Fig. 4 is a detail view illustrating the means for attaching the spring receiving shoulders to the spurs or prongs.

In the accompanying drawings the numeral 5 indicates the hub, 6 the spokes, 7 the rim, and 8 the tire of a vehicle wheel that may be of any ordinary and well known construction, the rim 7 being made to receive the shoe or tire 8 and being secured to the felly 9 in any ordinary manner.

Our improved device comprises a frame including two concentric rings, an inner ring 10, and an outer ring 11, joined at suitable intervals by arms 12, all of which may be integral one with another or constructed in any other desired manner. Openings are formed through these rings, each opening in one ring being in radial alinement with an opening in the other ring, and prongs or spurs 13 are located in these openings, and are movable radially therein, each prong being forced normally outward by a spring 14 located between the inner ring and against a shoulder on the prong, as shown clearly in Fig. 1 of the drawings. In the form of construction shown herein, the shoulders comprise cup shaped disks 15 within which cup holding pins 16 are located, the rims of the cups preventing displacement of the pins and thus serving to hold them in place. These disks are provided on the sides opposite the pins and near the edge with grooves 17 to receive the ends of the springs 14 and thus hold them in position and similar disks 18 are seated against the ring 10 to receive the opposite ends of the springs and hold them in position.

A pin 19 at the end opposite the points on each spur or prong rests against a washer 20, and these washers rest against buffers 21 that are composed of leather or any other suitable material and that will prevent the noise incident to the movement of the prongs in one direction after contact with the surface over which the wheel may be traveling, and under the force of the springs.

The frame is preferably made in sections so that it may occupy a minimum amount of space when not in use, and these sections may be movably secured together in any desired manner.

In the construction herein shown the frame is composed of two sections 22 and 23 that are joined by hinges 24. These hinges may be constructed so that the two sections may swing one upon the other or so that they may be separated in a manner that will be readily understood simply by removing the pintle of the hinge or otherwise. The outer ring 11 is provided at suitable intervals with seats 25 that are spaced apart at suitable intervals around the ring 11 and that are recessed to fit the edge of the rim 7, and clamp arms 26 are movably secured to the frame as by means of clamp bolts 27. These clamp arms each include a base having a flat surface of considerable length affording a rest for the arms. In the construction herein shown, these clamps comprising the seats 25 and arms 26, are located radially opposite the arms 12, the bolts 27 passing through said arms and the bases of the clamp arms 26 preferably near one end of each base whereby said bases are drawn up closely against the side of said radial arms and the ends of the arms 26 engaging the rim are drawn tightly into contact therewith.

The rings 10 and 11 are enlarged as at 28 and 29, at which points the holes for the prongs 13 are formed, this construction providing sufficient metal to contain the holes and at the same time maintain the strength of the rings.

From this construction it will be seen that our improved anti-skid device may be readily attached to and detached from a wheel by tightening or loosening the clamp screws 27 and moving the clamp arms to proper position to effect the purpose. The outer ends of the arms 26 are recessed to fit the edges of the rim 7 and this construction causes the arms to adjust themselves to the proper positions to rigidly clamp the frame in place, this self adjustment taking place as the screws 27 are tightened.

The spurs or prongs 13 are preferably so spaced and arranged that a plural number of them will be simultaneously in contact with the surface over which the wheel is traveling.

In accordance with the provisions of the patent statutes, we have described the principle of operation of our invention, together with the device which we now consider to represent the best embodiment thereof; but we desire to have it understood that the device shown is only illustrative, and that the invention can be carried out by other means.

We claim:

1. An anti-skid device including a frame, seats on said frame comprising recesses formed to fit and receive therein the edge of the rim of a wheel, clamp arms projecting from the frame and having their outer ends recessed to fit the rim of a wheel opposite said seats, said clamp arms each having bases with flat contacting surfaces and means for securing the bases of said arms in place.

2. An anti-skid device including a frame comprising concentric rings, radial arms joining said rings, seats at the outer ends of said radial arms, said seats comprising recesses formed to fit and receive the edge of a wheel rim, clamp arms seated against said radial arms and projecting with their outer ends spaced from said frame, said arms each having bases with flat resting surfaces said outer ends being recessed to fit the edge of the wheel rim opposite said seats, and means for drawing the flat resting surfaces of the bases of said clamp arms against the radial arms to secure them in place.

3. An anti-skid device including a frame, seats on said frame formed to receive the rim of a wheel, clamp arms projecting from the frame and having their outer ends formed to fit the rim of a wheel, said clamp arms comprising bases having flat resting surfaces to fit against flat surfaces on said frame, and means to engage said bases at that end nearest the rim of the wheel, to draw said bases in place and their outer ends against the wheel rim.

FREDERICK E. BANNING.
KEENEY E. BANNING.

Copies of this patent may be obtained for five cents each, by addressing the "Commissioner of Patents, Washington, D. C."